US009910857B2

(12) United States Patent
Jiang et al.

(10) Patent No.: US 9,910,857 B2
(45) Date of Patent: Mar. 6, 2018

(54) DATA MANAGEMENT

(71) Applicant: International Business Machines Corporation, Armonk, NY (US)

(72) Inventors: Peng Hui Jiang, Beijing (CN); Pi Jun Jiang, Beijing (CN); Xi Ning Wang, Beijing (CN); Liang Xue, Beijing (CN); Wen Yin, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 270 days.

(21) Appl. No.: 14/263,016

(22) Filed: Apr. 28, 2014

(65) Prior Publication Data
US 2014/0324795 A1    Oct. 30, 2014

(30) Foreign Application Priority Data

Apr. 28, 2013  (CN) .......................... 2013 1 0155895

(51) Int. Cl.
*G06F 17/30* (2006.01)
(52) U.S. Cl.
CPC .............................. *G06F 17/30156* (2013.01)
(58) Field of Classification Search
CPC ....... G06F 17/300067; G06F 17/30489; G06F 3/0641
USPC ....... 707/692, 769, 760, 640, 758, 711, 662, 707/649, 646; 713/189, 176, 100, 170; 341/51
See application file for complete search history.

(56) References Cited

U.S. PATENT DOCUMENTS 3,670,307 A * 6/1972 Arnold ................ G06F 12/0804
711/131
4,558,302 A * 12/1985 Welch ..................... G06T 9/005
341/51
6,189,097 B1 * 2/2001 Tycksen, Jr. .......... H04L 9/3247
713/100

(Continued)

FOREIGN PATENT DOCUMENTS

CN      103065041 A     4/2013
WO      2010033961 A1   3/2010

OTHER PUBLICATIONS

List of IBM Patents or Patent Applciations Treated as Related—Date Filed Apr. 23, 2014; 1 page.

(Continued)

*Primary Examiner* — Jeffrey A Burke
*Assistant Examiner* — Thong Vu
(74) *Attorney, Agent, or Firm* — Cantor Colburn LLP; Farrokh Pourmirzaie

(57) ABSTRACT

Methods and systems for data management are disclosed. With embodiments of the present disclosure, data files originating from the same source data can be de-duplicated. One such method comprises calculating one or more of a first characteristic value for first data in a first format, and one or more second characteristic values for one or more data in one or more second formats into which the first data can be converted, said characteristic value uniquely representing an arrangement characteristic of at least part of bits of data in a particular format. The method also includes storing one of the first data and the second data in response to one of the calculated characteristic values being the same as a stored characteristic value corresponding to a second data.

9 Claims, 9 Drawing Sheets

(56) References Cited

U.S. PATENT DOCUMENTS

| | | | |
|---|---|---|---|
| 6,317,746 B1* | 11/2001 | Franklin, Jr. | G06F 8/78 |
| 7,567,188 B1 | 7/2009 | Anglin | |
| 7,925,683 B2 | 4/2011 | Jain | |
| 8,140,491 B2 | 3/2012 | Mandagere et al. | |
| 8,140,786 B2* | 3/2012 | Bunte | G06F 11/1451 |
| | | | 711/161 |
| 8,266,115 B1 | 9/2012 | Park | |
| 8,396,838 B2* | 3/2013 | Brockway | G06F 17/30616 |
| | | | 707/662 |
| 8,600,048 B1* | 12/2013 | Hansen | G06F 21/62 |
| | | | 380/28 |
| 8,667,273 B1* | 3/2014 | Billstrom | G06F 21/6209 |
| | | | 713/165 |
| 8,825,695 B2* | 9/2014 | Studer | G06F 17/2264 |
| | | | 707/769 |
| 2004/0140991 A1* | 7/2004 | Trotta | G06T 17/00 |
| | | | 715/700 |
| 2005/0131902 A1* | 6/2005 | Saika | G06F 17/30067 |
| 2005/0182780 A1 | 8/2005 | Forman et al. | |
| 2005/0200876 A1* | 9/2005 | Iguchi | G06F 17/2264 |
| | | | 358/1.13 |
| 2005/0203872 A1* | 9/2005 | Kwong Kwan | G06T 1/0028 |
| 2007/0204165 A1* | 8/2007 | Lytle | G06F 21/64 |
| | | | 713/176 |
| 2007/0276836 A1* | 11/2007 | Chatterjee | G06F 17/30194 |
| 2008/0086642 A1* | 4/2008 | Takahashi | H04L 9/3247 |
| | | | 713/176 |
| 2008/0091725 A1 | 4/2008 | Hwang | |
| 2008/0134175 A1* | 6/2008 | Fitzgerald | G06F 9/45533 |
| | | | 718/1 |
| 2009/0087098 A1* | 4/2009 | Ohira | G06K 9/00442 |
| | | | 382/190 |
| 2010/0145952 A1* | 6/2010 | Yoon | G06F 17/30011 |
| | | | 707/747 |
| 2010/0191760 A1* | 7/2010 | Kusumura | G06F 17/30569 |
| | | | 707/760 |
| 2010/0217750 A1* | 8/2010 | Tokoro | G06F 17/30569 |
| | | | 707/640 |
| 2010/0268952 A1* | 10/2010 | Chung | H04L 9/3236 |
| | | | 713/170 |
| 2010/0325093 A1 | 12/2010 | Bates et al. | |
| 2011/0016091 A1 | 1/2011 | Prahlad et al. | |
| 2011/0016132 A1 | 1/2011 | Okamoto | |
| 2011/0071989 A1 | 3/2011 | Wilson et al. | |
| 2011/0093471 A1* | 4/2011 | Brockway | G06F 17/30616 |
| | | | 707/747 |
| 2011/0173346 A1* | 7/2011 | Neben | G06Q 30/00 |
| | | | 709/246 |
| 2011/0196900 A1 | 8/2011 | Drobychev et al. | |
| 2011/0246489 A1* | 10/2011 | Pope | H04L 45/742 |
| | | | 707/754 |
| 2012/0233135 A1 | 9/2012 | Tofano | |
| 2012/0323978 A1* | 12/2012 | Van Rooyen | G06F 17/30557 |
| | | | 707/812 |
| 2013/0018704 A1 | 1/2013 | Liu | |
| 2013/0080404 A1 | 3/2013 | Smith et al. | |
| 2013/0086127 A1* | 4/2013 | Pogmore | H04L 9/0869 |
| | | | 707/803 |
| 2013/0166580 A1* | 6/2013 | Maharajh | H04L 65/605 |
| | | | 707/758 |
| 2013/0198459 A1* | 8/2013 | Joshi | G06F 12/084 |
| | | | 711/130 |
| 2013/0282662 A1* | 10/2013 | Kumarasamy | G06F 17/30289 |
| | | | 707/649 |
| 2014/0108813 A1* | 4/2014 | Pauker | G06F 21/6218 |
| | | | 713/189 |
| 2014/0164352 A1* | 6/2014 | Denninghoff | H03H 9/02622 |
| | | | 707/711 |
| 2014/0188805 A1* | 7/2014 | Vijayan | G06F 11/1453 |
| | | | 707/646 |
| 2014/0258559 A1* | 9/2014 | Vendrow | H04L 65/601 |
| | | | 709/246 |

OTHER PUBLICATIONS

Intellectual Property Office, Search Report, Application No: GB1307333.3, dated Oct. 22, 2013, 4 pages.

Paschalakis, S. et al., "Detection of Repeated Segments in Video Sequences", 2010 Digest of Technical Papers, International Conference on Consumer Electronics, CCE 2010; pp. 315-316.

U.S. Appl. No. 14/259,506; Non-Final Office Action, filed Apr. 23, 2014; dated: Dec. 31, 2015; 23 pages.

* cited by examiner

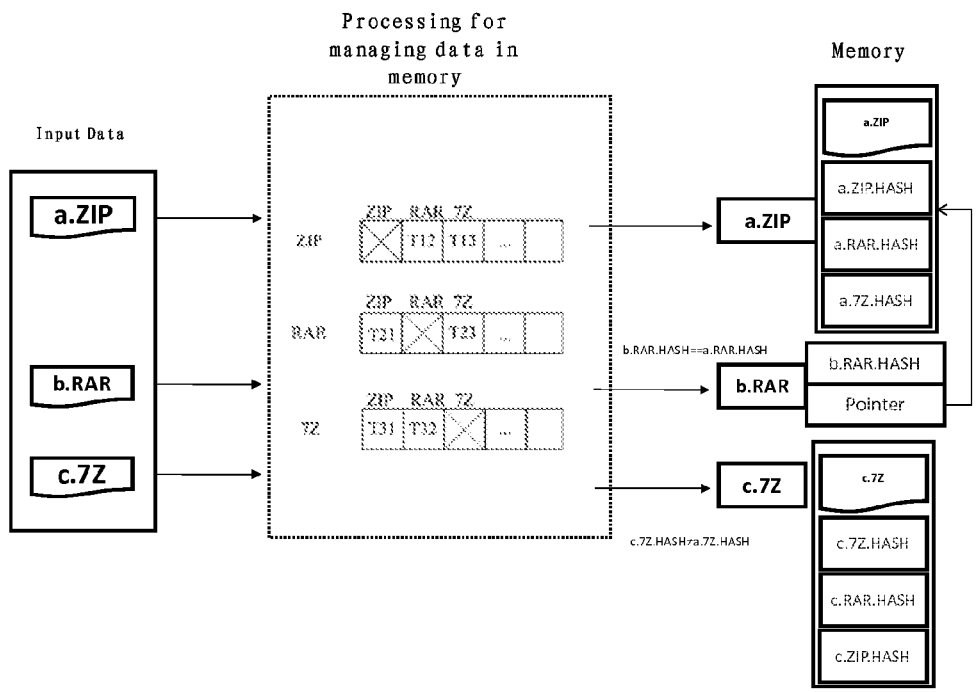

Calculating one of the following characteristic values a characteristic value for a first data in a first format and in response to that there is at least one conversion policy for converting from the first format to at least one second format but no conversion policy for converting from the at least one second format into the first format, calculating at least one characteristic value for the at least one data in the at least one second format into which the first data can be converted

702

In response to one of the one or more calculated characteristic values being the same as a stored characteristic value corresponding to a second data, storing one of the first data and the second data

Fig. 7A

DATA MANAGEMENT

PRIORITY

This application claims priority to Chinese Patent Application No. 201310155895.1, filed 28 Apr. 2013, and all the benefits accruing therefrom under 35 U.S.C. § 119, the contents of which in its entirety are herein incorporated by reference.

BACKGROUND

The present disclosure relates to a method and system for data management, and more specifically, to a data de-duplication method and system which are capable of performing de-duplication on data files in a memory which originate from the same source data.

With the increased amount of data storage and the emergence of cloud memory, there is an increasing need for properly managing the data in the storage space so as to meet the increasing need for data storage. Sometimes, users may store a lot of data which are the same or substantially the same with each other during the storing of data, and thus a data de-duplication technique is proposed to eliminate the redundant data so that the storage utility is improved and the cost of network data transfer is reduced.

For example, contemporaneous techniques for data de-duplication usually eliminate the redundant data having the same bits by comparing the content of two data files one binary bit by one binary bit. When dealing with two data files having different binary bit strings, contemporaneous data de-duplication techniques may not be well done.

SUMMARY

According to one aspect disclosed herein, there is provided a method for data management. The method comprises calculating one or more of a first characteristic value for first data in a first format, and one or more second characteristic values for one or more data in one or more second formats into which the first data can be converted, said characteristic value uniquely representing an arrangement characteristic of at least part of bits of data in a particular format. The method also includes storing one of the first data and the second data in response to one of the calculated characteristic values being the same as a stored characteristic value corresponding to a second data.

According to another aspect disclosed herein, there is provided a system for data management. The system comprises a calculating unit and a managing unit. The calculating unit is configured to calculate one or more of a first characteristic value for first data in a first format, and one or more second characteristic values for one or more data in one or more second formats into which the first data can be converted, said characteristic value uniquely representing an arrangement characteristic of at least part of bits of data in a particular format. The managing unit is configured to store one of the first data and the second data in response to one of the calculated characteristic values being the same as a stored characteristic value corresponding to a second data.

According to yet another aspect disclosed herein, there is provided a computer program product for data management. The computer program product comprises a non-transitory computer readable storage medium having program code embodied therewith. The program code is executable by a processor to perform a method. The method comprises calculating one or more of a first characteristic value for first data in a first format, and one or more second characteristic values for one or more data in one or more second formats into which the first data can be converted, said characteristic value uniquely representing an arrangement characteristic of at least part of bits of data in a particular format. The method also includes storing one of the first data and the second data in response to one of the calculated characteristic values being the same as a stored characteristic value corresponding to a second data.

According to various aspects disclosed herein, by comparing one or more of the characteristic value calculated for the input data and the characteristic values of the data with other formats into which the input data can be converted with the characteristic values which have already been stored in the metadata base, the data files originating from the same source data can be determined based on the same characteristic value, and thus the data files originating from the same source data can be de-duplicated. According to various embodiments of the present disclosure, the amount of data storage can be reduced without substantially affecting the user's experience while the workload for calculation and processing can be reduced.

BRIEF DESCRIPTION OF THE SEVERAL VIEWS OF THE DRAWINGS

Through the more detailed description of some embodiments of the present disclosure in the accompanying drawings, the above and other objects, features, and advantages of the present disclosure would become more apparent, wherein the same reference generally refers to the same components in the embodiments of the present disclosure.

FIGS. 4A and 4B show examples of a metadata base and a conversion policy library according to an exemplary embodiment of the invention, in which FIG. 4A shows an exemplary embodiment of the metadata base and FIG. 4B shows an exemplary embodiment of the conversion policy library.

FIG. 6B shows a schematic diagram for illustrating the method as shown in FIG. 6A.

FIG. 7A shows an exemplary flow chart of a method for data management according to another embodiment of present disclosure.

DETAILED DESCRIPTION

Figure 1:
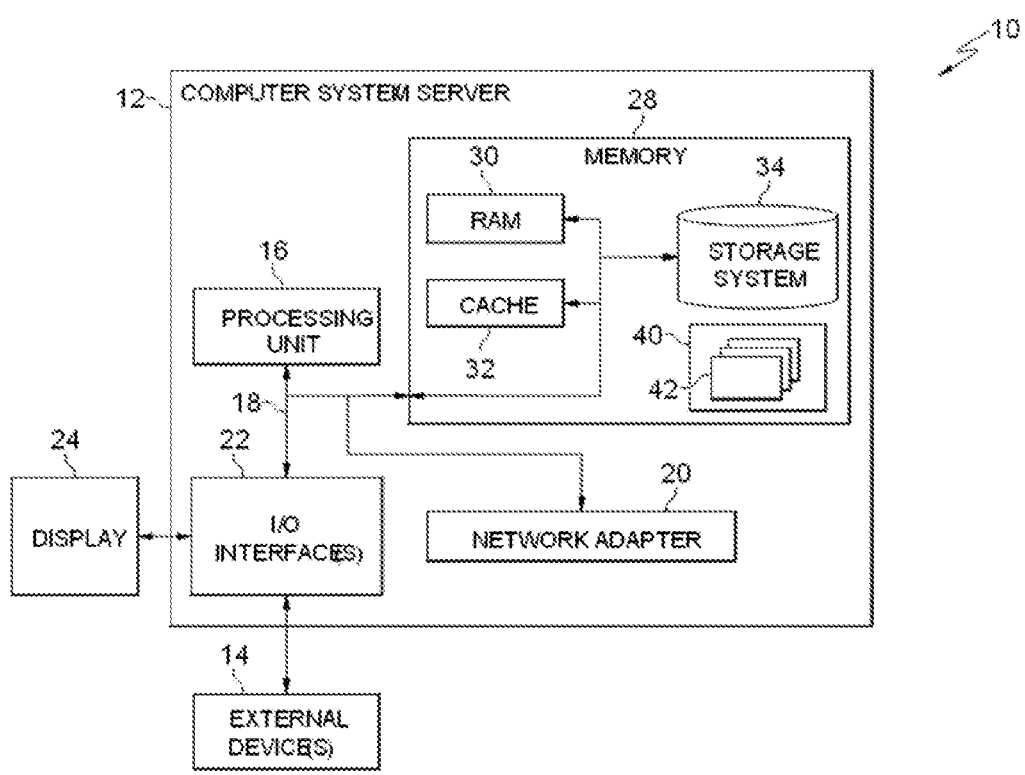
FIG. 1 shows a block diagram of an exemplary computer system/server 12 which is applicable to implement the embodiments of the present invention.

In practice, there are often data files originating from the same source which have different binary bit strings, but actually are substantially the same data. For example, the files from the same source are of different compression formats such as rar, zip, 7z or the like. However, since they have different binary bit strings after compression using different file compression formats, they may not be de-duplicated solely by comparing the binary bits.

Various embodiments disclosed herein provide a method and system to perform de-duplication on the data files which are from the same source data. Various embodiments disclosed herein provide a method and system which are capable of reducing the amount of data storage while maintaining good user experience. Various embodiments disclosed herein provide a method and system which are capable of reducing the amount of data storage with less calculation cost and processing cost.

Some embodiments are described in more detail with reference to the accompanying drawings which illustrate these embodiments. However, the inventive techniques disclosed herein may be implemented in various manners, and thus should not be construed to be limited to the embodiments disclosed herein. On the contrary, the embodiments herein are provided for the thorough and complete understanding of these inventive techniques, and to completely convey the scope of the present disclosure to those skilled in the art.

As would be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Computer program code for carrying out operations of embodiments disclosed herein may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of various embodiments disclosed herein are described below with reference to flowchart illustrations and/or block diagrams of methods, apparatus (systems) and computer program products. It would be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, shown is a block diagram of an example computer system/server 12 on which the embodiments of the present disclosure can be implemented. The computer system/server 12 shown in FIG. 1 is only illustrative and is not intended to suggest any limitation as to the scope of use or functionality of embodiments described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As would be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of various embodiments as described herein.

Computer system/server 12 may also communicate with one or more external devices 14 such as: a keyboard; a pointing device; a display 24; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Moreover, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
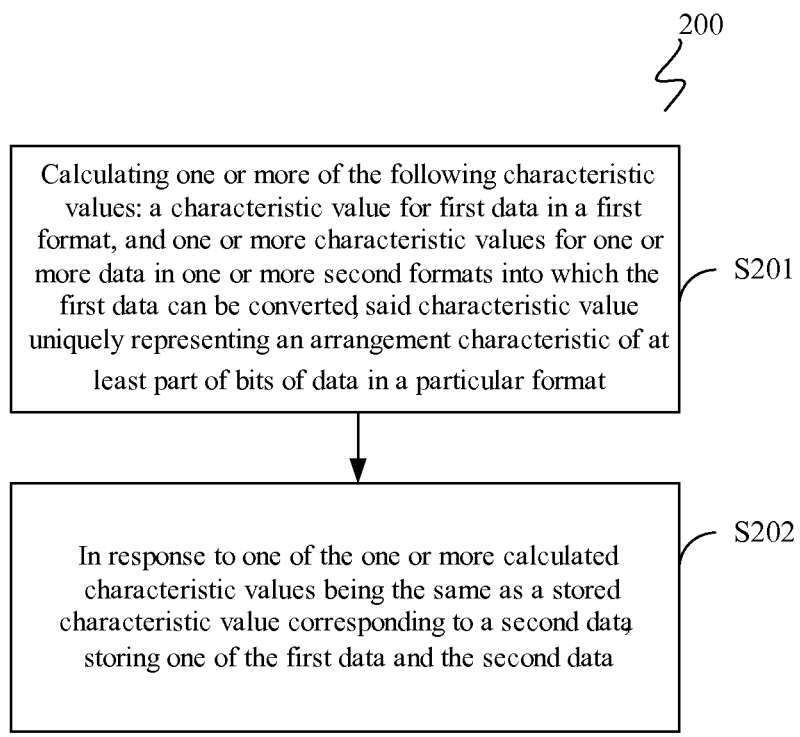
FIG. 2 shows an exemplary flow chart of a method for data management according to an embodiment of the present invention.

FIG. 2 shows an example flow chart of a method 200 for data management according to an embodiment of the present invention. In FIG. 2, the method 200 according to one embodiment disclosed herein includes: step S201 of calculating one or more of the following characteristic values: a characteristic value for first data in a first format, and one or more characteristic values for one or more data in one or more second formats into which the first data can be converted, said characteristic value uniquely representing an arrangement characteristic of at least part of bits of data in a particular format; and step S202 of in response to one of the one or more calculated characteristic values being the same as a stored characteristic value corresponding to a second data, storing one of the first data and the second data.

According to one embodiment, the method 200 for data management can take place in response to a user action indicating storage of data (for example into a memory) or indicating that the user would like to clear up the redundant data (in the memory) once a great deal of data has already been stored (for example in the memory). The present disclosure does not limit the method 200 as to the time or condition for the start of the method, and the method 200 can perform the process for data management in real time, at a fixed time, in response to a user's request, or automatically.

According to one embodiment, the step S201 may include step S2011 (not shown in the Figures) of calculating the characteristic value for the first data in the first format and step S2012 (not shown in the Figures) of determining, at least based on conversion policies between different formats, whether to calculate the one or more characteristic values for the one or more data in the one or more second formats into which the first data can be converted.

In particular, in the step S2012 mentioned above, the step of determining whether to calculate the one or more characteristic values for the one or more data in the one or more second formats into which the first data can be converted may be performed based on at least the conversion policies between different formats (further described in conjunction with FIGS. 4-7). These conversion policies between different formats may be stored in a conversion policy library. The conversion policy library for storing the conversion policies between different formats is only an illustration and is not a limitation. Some embodiments may use other information that indicates whether to calculate the one or more characteristic values for the one or more data in the one or more second formats into which the first data can be converted.

Generally, the step of calculating the one or more characteristic values for the one or more data in the one or more second formats into which the first data can be converted may further include: converting the first data in the first format into one or more data in one or more second formats in accordance with one or more conversion policies for converting the first format into the one or more second formats; and calculating the one or more characteristic values for the one or more data in the one or more second formats. The step of calculating the one or more characteristic values for the one or more data in the one or more second formats into which the first data can be converted may further include calculating the one or more characteristic values for the one or more data in the one or more second formats into which the first data can be converted, directly with reference to a correspondence table without the step of converting the first data in the first formats into the data in the one or more second formats.

According to one embodiment, in the step S201, different data formats (such as the first format and the second format) may be distinguished according to the information about the data, such as one or more of the following: the extension name information; the data version information; the resolution information; the compression ratio information; information regarding compression manners; information regarding encoding manners; or the like. Examples of the different file compression formats include (but are not limited to) zip, rar, 7z, tgz, tz, iso or the like. Examples of different audio formats include (but are not limited to) ape, way, wma, mp3, acc, MMF, AMR, M4A, M4R, OGG, MP2, WV or the like. Examples of different video formats or encoding formats include (but are not limited to) avi, mov, mp4, wmv, rmvb, RM, MPG, MPEG, FLV, 3GP, MP4, SWF, ASF, DIVX, XVID, 3GP2, FLV1, MPEG1, MPEG2, MPEG3, MPEG4, H.264 or the like. Examples of different resolution formats include (but are not limited to) video data of 720p and 1080p, audio files of 64 kbps and 192 kbps or the like. Examples of different picture formats include (but are not limited to) PCX, TIFF, BMP, JPEG, PNG, ICO or the like. Examples of different text formats or version formats may include (but are not limited to) doc, docx, ppt, pptx, RTF, txt, lrc, pdf, doc, ppt, jar, doc, txt, pdf, umd, chm, odt or the like. Examples of the different programming formats include (but are not limited to) HTML, ASP or the like. It should be noted that the term of "one or more second formats" herein may refer to one format which is different from the first format, or a plurality of different formats which are different from the first format and different from each other.

According to one embodiment disclosed herein, in the step S201, said characteristic value uniquely represents an arrangement that characteristic of at least part of bits of data in a particular format may be a HASH value. The HASH value can uniquely represent an arrangement characteristic of bits in a certain length. The amount of data obtained by calculating the HASH value is usually smaller than the amount of the original data and the calculated HASH value can uniquely represent the bit arrangement characteristic of the original data. Therefore, by comparing the HASH values, the amount of data to be compared can be reduced and the efficiency of comparison can be increased. Furthermore, it can be determined whether the original bit strings are the same or not by comparing the HASH values. Examples for calculating the HASH value include Message Digest Algorithm 5 (MD5), Secure Hash Algorithm 1 (SHA1) and so on. The HASH algorithm may produce a conflict, but the probability of conflict is very small, and thus is not described in detail so as to simplify the description. In addition to the HASH value, the characteristic values may be any other values which can uniquely represent the arrangement characteristic for the bits in a certain length, and the examples thereof are omitted here. As an example but not a limitation, various embodiments disclosed herein use the HASH value as the characteristic value.

In the step S201, according to an embodiment, the HASH value representing the arrangement characteristic for at least part of the bits of the data may be calculated, which may include calculating the HASH value for part of the bits of the data and calculating the HASH value for all the bits of the data. For example, there may be two video files having different resolutions, but most of the contents thereof are the same except that a segment at the beginning or at the end or in the middle of the video (e.g. the advertisement part) is different from the other. In this case, a HASH value for the most of the content (i.e. part of the bits) after the video file in the first resolution is converted into the one in the second resolution may be calculated and compared with the HASH value for the most of the content in the original video file in the second resolution. If the two calculated HAS values are the same, it can be inferred that most of the contents of the two video files are the data from the same source and are redundant with each other. Thus, an excellent de-duplication effect can be obtained with using the techniques described herein. Alternatively, in the case where data has been segmented appropriately so as to retain the main portion for comparison, the HASH value can be calculated for all the bits of the data.

Herein, the term of "storing" (one of the first data and the second data) in the step S202 may include: the action of storing (into the memory from an external source) in the case where the data is to be stored to the memory from outside; or the state of retaining the storage (in the memory) in the case where the date is already stored in the memory when being cleaned up. Similarly, the term of "not storing" as used herein may also include not storing (into the memory) in the case where the data is to be stored to the memory from outside, or deleting (from the memory) in the case where the date is already stored in the memory when being cleaned up.

Of course, in the step S202, it may be selected which of the first data and the second data is to be stored according to a predetermined rule. For example, of the first data and the second data, the one with fewer data amount may be selected to be stored based on the size of the data amount. For example, in the case of video or audio data, based on the resolution, the one of the first and second data which has a higher or lower resolution may be selected to be stored in accordance with the user preference. As another example, on a chronological basis, the one of the first and second data which comes first may be selected to be stored. Of course, there are also many other predetermined rules that may be utilized, though further description is omitted here.

With the method 200 for data management as described above, if one of the characteristic values calculated for the input data is the same as a certain characteristic value which has been stored, it may be determined that this input data and the data corresponding to this certain characteristic value originate from the same source, and only one of the two files from the same source needs to be stored. This de-duplicates the data files having the same source data and reduces the amount of data in the memory.

It is to be noted that "data files from the same source data" as used herein can include this same source data as well as various data files converted in formats from this same source data, and may include only the various data files converted in formats from this same source data.

Hereinafter, the process of method 200 for data management shown in FIG. 2 and the embodiments of method 200 are further described in combination with the schematic diagram in FIG. 3.

Figure 3:
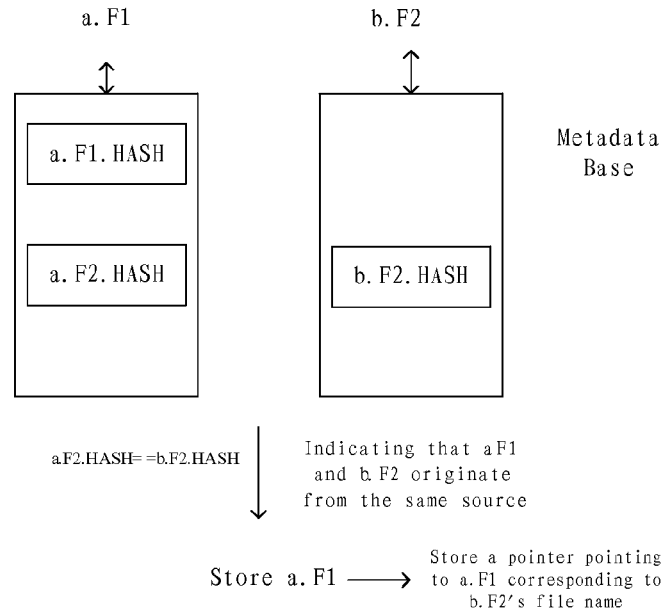
FIG. 3 shows a schematic diagram for illustrating the method for data management according to the embodiment of present disclosure shown in FIG. 2.

With reference to FIG. 3, for example, a data of a.F1 is input, and the format thereof is F1. In the step S201 of the method 200, a HASH value for the input data a.F1 is calculated, for example, a.F1.HASH. It is assumed that the format of F1 can be converted into, for example, F2. In the step S201, a HASH value for data a.F2 in the format of F2 into which data a.F1 can be converted is also calculated, for example, a.F2.HASH. As such, two HASH values of a.F1.HASH and a.F2.HASH are obtained by the calculations. It is assumed, for example, that a HASH value corresponding to the data b.F2, for example, b.F2.HASH is stored in a metadata base which is used for storing HASH values. In the step S202, in response to the calculated HASH value of a.F2.HASH being the same as the HASH value of b.F2.HASH stored in the metadata base, it can be determined that a.F1 and b.F2 are from the same source data and thus only one of data a.F1 and b.F2 (for example, a.F1) is stored. Therefore the redundant data from the same source data can be eliminated and the amount of data storage is reduced without reducing the substantial content while a good experience for the users is also maintained.

In the embodiments described above, with respect to the step 201 of calculating one or more of the following characteristic values are calculated: a characteristic value for first data in a first format; one or more characteristic values for one or more data in one or more second formats into which the first data can be converted; HASH values for data a.F1; and data a.F2 in a format of F2 into which data a.F1 can be converted. Nevertheless, these are just examples and not limitations. In some embodiments, only the HASH value for the input data is calculated. In some embodiments, only one or more of the HASH values for the data in other formats into which the input data can be converted. In some embodiments, one or more of the HASH values aforementioned may be calculated as required. Although this description refers to an example in which a HASH value for the input data is calculated first, this ordering is not a limitation.

According to an embodiment, in the case where only data a.F1 is selected to be stored in step S202, either storage of data b.F2 is omitted, or data b.F2 is deleted from the memory (in the case where the data b.F2 has already been stored). In this manner, only one data a.F1 is retained in stored. For example, sometimes TV (television) shows with various resolutions for the same content may be stored in the memory by the user and the user would like to retain only one TV show with a certain resolution since he does not need video files with other resolutions. In this case, the video files with other resolutions may be deleted.

According to an embodiment, in another case where the user may desire to retrieve the data b.F2 later, the method 200 may further include: in response to storing the one of the first data and the second data (i.e., a.F1 in this example), not storing the other one (i.e., b.F2 in this example) of the first data a.F1 and the second data b.F2, and instead only storing an indicator pointing to said one of the first data and the second data (i.e., a.F1 in this example). That is, with reference to the example in FIG. 3 for example, only data a.F1 is selected to be stored; the data b.F2 itself would not be stored or would be deleted, and the indicator (for example, a pointer) pointing to data a.F1 is stored. This indicator pointing to the data a.F1 may be stored in such a way as to correspond to the file name "b.F2" of the data b.F2, so that this indicator pointing to data a.F1 can be found by the file name of "b.F2", and the data a.F1 can be found with this indicator if the user would like to retrieve the data b.F2 later. In such a case, the found data a.F1 is of the format F1 which is different from the format F2 of b.F2, but since the format F1 can be converted into the format F2 as described above, the data a.F1 can be converted into a.F2 and the converted data a.F2 may be provided as the data b.F2 which is to be retrieved. Of course, this retrieving process is just an example and other examples of the retrieving process are described below with reference to FIG. 8.

Accordingly, the inventive techniques disclosed herein make it unnecessary to store the indicator pointing to the data originating from the same source data to replace the redundant data which is not stored. Instead, by storing the indicator pointing to the data originating from the same source data to replace the redundant data which is not stored, the user can, when retrieving this non-stored redundant data later, obtain the data from the same source data by searching for this pointer to find this data from the same source data as the data to be retrieved. Alternatively, the user can convert the format of this data from the same source data to obtain the data to be retrieved. As such, the user would not realize that this data is not stored since he can obtain the same data whenever he wants to retrieve this data, which provides a better user experience.

According to an embodiment, the method 200 may further include storing the first data in response to none of the calculated characteristic values being the same as those stored characteristic values. That is to say, in the example as shown in FIG. 3, if none the calculated characteristic values, for example, one of the HASH values a.F1.HASH and a.F2.HASH is the same with those stored characteristic values. This means that no data which is the same as the data a.F1 or comes from the same source data as the data a.F1 has been stored, and the data a.F1 itself may be stored directly.

According to an embodiment, the method 200 may further include storing the calculated characteristic values, in such a way as to correspond to the first data. The calculated characteristic values corresponding to the first data may be stored in a metadata base which is used for storing the characteristic values. As an example, with reference to FIG. 3, the HASH values a.F1.HASH and a.F2.HASH corresponding to the data a.F1 may be stored in the metadata base, so that the metadata base can be expanded for later use in the comparison of the characteristic values. Herein, the various characteristic values are stored by using a metadata base, so that this metadata base can be expanded each time a new characteristic value is calculated so as to be updated to adapt the comparison of the characteristic values in the future. Using the metadata base is of course an example but not a limitation, and other mechanisms for storing the characteristic values are contemplated. In addition, it is to be noted that in this embodiment, storage of the data a.F2 converted from the data a.F1 is usually omitted, and only the characteristic value (e.g. a.F2.HASH) for the converted data a.F2 is stored. This reduces the amount of data storage for the converted data. Furthermore, in this embodiment, the characteristic value a.F2.HASH for the converted data is stored in such a way as to correspond to the original input data a.F1 but not corresponding to the converted data a.F2, so that in the case where the characteristic value a.F2.HASH is found to be the same as a certain characteristic value in the future, it can be known that the original input data a.F1 corresponding thereto originates from the same source as the original input data corresponding to this certain characteristic value.

With the embodiments described above, the amount of data storage can be reduced without reducing the substantial content while a good experience for the users can be maintained.

Figure 4A:
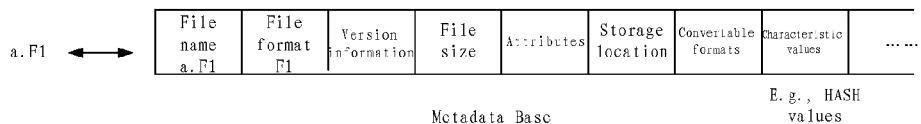

FIG. 4A shows a schematic example of the metadata base which can be used to store the characteristic values. According to an embodiment disclosed herein, the metadata base may also store metadata other than the characteristic values (e.g., HASH values) which correspond to the data files. Examples include file names, file formats, version information, size of the file, attributes, storage position, convertible formats, and other information which is known to be used as a metadata. A data file a.F1 corresponds to the metadata base associated therewith. The indicator pointing to the data a.F1 as described with reference to FIG. 3 may also be stored in the metadata base correspondingly to the data file b.F2. Of course, this indicator pointing to the data a.F1 may be stored within the memory or elsewhere. This is no limitation on the storage position of the indicators (e.g. the pointers) in this disclosure. It is to be noted that the metadata base in such a configuration is expansible and may be self-updated automatically because the metadata base may progressively store newly calculated characteristic values, indicators or other various metadata so as to be used in the comparison of the HASH values or in the data retrieving in the future.

Figure 4B:
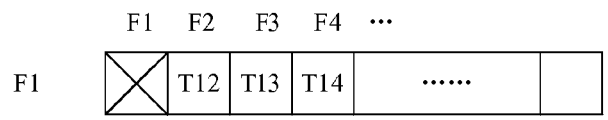
Figure 4B:
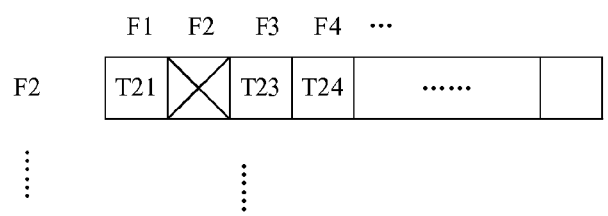

FIG. 4B shows an exemplary implementation of the conversion policy library for storing the conversion policies between different formats. FIG. 4B shows an exemplary conversion policy library storing the conversion policies between different formats (e.g. F1, F2, and F3) in a form of list. This list can save space and is suitable for accommodating new conversion policies. Of course, other forms of the conversion policy library may be conceived to store the conversion policies between different formats, such as a form of matrix.

According to an embodiment, the conversion policies stored in the conversion policy library may be preset. In another embodiment, the conversion policy library may be dynamically expandable, that is, the conversion policies may be deleted, altered or added (for example, the new conversion policies which would be presented in the future may be added).

The conversion policies may be unidirectional or bidirectional. For example as shown in FIG. 4B, the format F1 can be converted into the format F2 without any loss and the format F2 can also be converted into the format F1 without any loss, and such a conversion is referred to as a bidirectional conversion. In contrast, if one format can be converted into the other format but the conversion cannot be reversed, such conversion would be referred to as a unidirectional conversion.

By using the conversion policies, a format conversion can be directly performed between the data files with different formats which come from the same source data without the need to restore the data file with one format back to the same original source data and then converting this same original source data to another format. Therefore the workload for calculation and processing in restoring back to the same source data and converting this same source data to another format can be reduced.

The metadata base and the conversion policy library may be stored separately from the memory, stored at the memory or elsewhere. That is to say, there is no limitation on the storage position of the data itself, the characteristic values, other metadata, the metadata base, indicators, the conversion policies or the conversion policy library, as long as the data itself, the characteristic values, other metadata, the metadata base, indicators, and/or the conversion policies for the formats of the data with respect to the same data may be stored correspondingly to each other, so that these related information can be found by using, for example, only the file name of this data.

In addition, as described above, according to an embodiment, the step of determining whether to calculate the one or more characteristic values for the one or more data in the one or more second formats into which the first data can be converted in step S201 may be performed at least based on the conversion policies between different formats. Various embodiments for performing the step of determining, at least based on conversion policies between different formats, whether to calculate the one or more characteristic values for the one or more data in the one or more second formats into which the first data can be converted would be illustrated with reference to FIGS. 5-7 below.

Figure 5A:
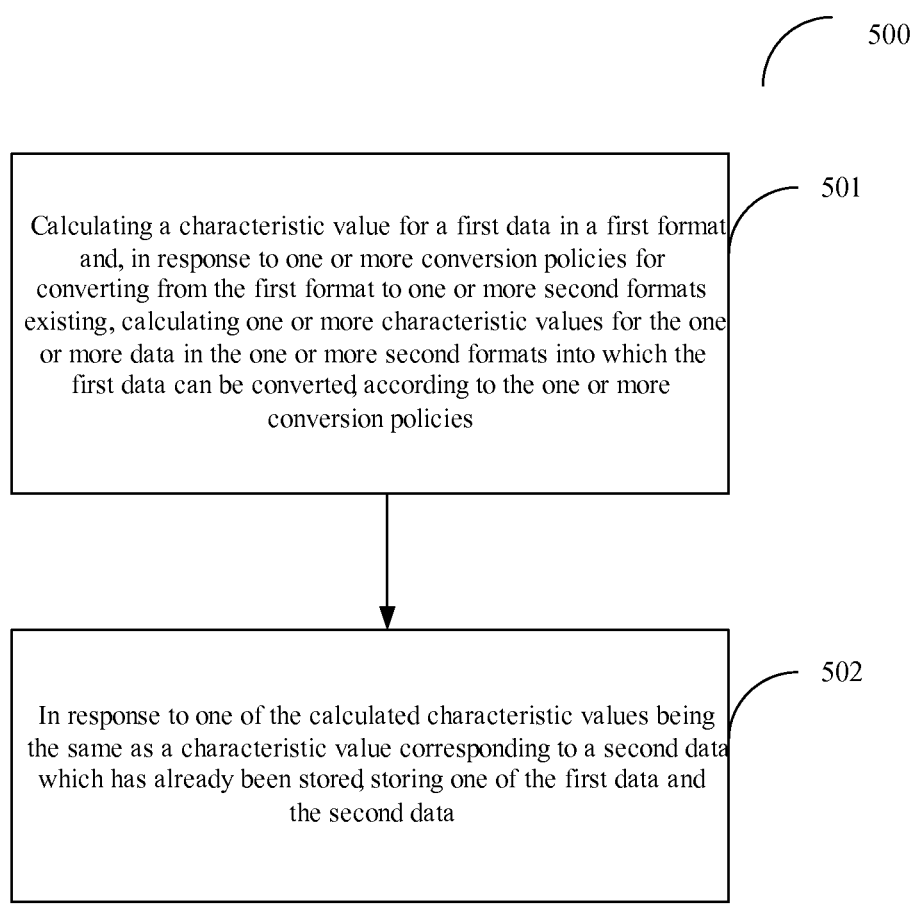
FIG. 5A shows an exemplary flow chart of a method for data management according to another embodiment of present disclosure.

FIG. 5A shows an exemplary flow chart of a method 500 for data management according to another embodiment of the present disclosure. The method 500 includes: step S501 of calculating a characteristic value for a first data in a first format and, in response to one or more conversion policies for converting from the first format to one or more second formats existing; calculating one or more characteristic values for the one or more data in the one or more second formats into which the first data can be converted, according to the one or more conversion policies; and step S502 of in response to one of the calculated characteristic values being the same as a characteristic value corresponding to a second data which has already been stored, storing one of the first data and the second data.

It is noted that in response to that no conversion policy for converting from the first format into the one more second formats exists, there is no need to convert the first data in the first format into the one or more data in the one or more second formats and no need to calculate the one or more characteristic values for the one or more data in the one or more second formats.

Figure 5B:
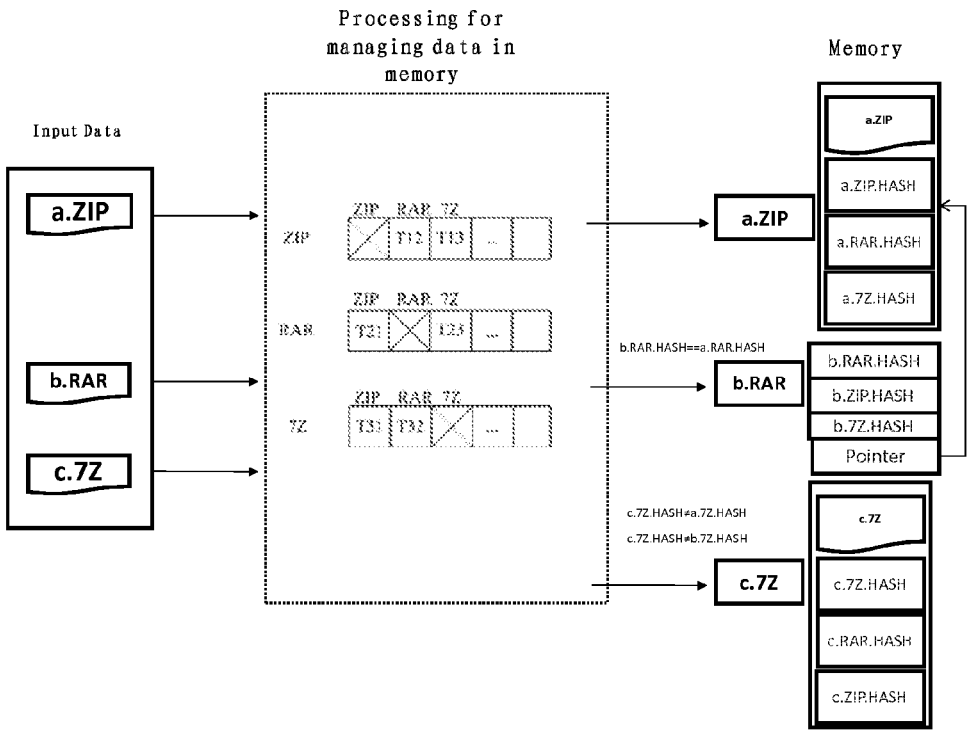
FIG. 5B shows a schematic diagram for illustrating the method as shown in FIG. 5A.

The flow of the method as shown in FIG. 5A is explained in combination with FIG. 5B. FIG. 5B illustrates the process to be performed in the case where for example a.ZIP, b.RAR and c.7z are to be stored. In FIG. 5B, there are conversion policies for the conversion between three formats of ZIP, RAR and 7Z in the conversion policy library, for example. In particular, as shown in the middle section of FIG. 5B, there are a conversion policy T12 for the conversion from ZIP to RAR, a conversion policy T13 for the conversion from ZIP to 7Z, a conversion policy T21 for the conversion from RAR to ZIP, a conversion policy T23 for the conversion from RAR to 7Z, a conversion policy T31 for the conversion from 7Z to ZIP and a conversion policy T22 for the conversion from 7Z to RAR. Such conversion policies are known in the art and there is some currently known software for implementing the conversion of the files between different formats and the details thereof are omitted here.

With reference to FIG. 5B, for example, the data a.ZIP is input first. It is assumed that there is no HASH value currently stored in the metadata base. According to the method 500 as shown in FIG. 5A, the HASH value, a.ZIP.HASH for the input data a.ZIP is calculated and, in response to that there are conversion policies for the conversion from the ZIP format into the RAR and 7Z formats in the conversion policy library, the data a.ZIP is converted into data a.RAR and data a.7Z in accordance with the conversion policies, and the HASH values a.RAR.HASH and a.7Z.HASH for the data a.RAR and a.7Z are calculated. At this point, since there is no HASH value stored in the metadata base, it can be determined that there is no HASH value in the metadata base that is the same as those calculated, and the data a.ZIP may be directly stored. In addition, the calculated HASH values a.ZIP.HASH, a.RAR.HASH and a.7Z.HASH may be stored in the metadata base in such a way as to correspond to the data a.ZIP so as to expand the metadata base. It is noted that herein, it is possible that the data a.RAR and data a.7Z themselves converted from a.ZIP are not stored and only the HASH values a.RAR.HASH and a.7Z.HASH for these data are stored so as to save space.

Next, the data b.RAR is input. According to the method 500 as shown in FIG. 5A, the HASH value, b.RAR.HASH, for the input data b.RAR is calculated and, in response to conversion policies for the conversion from the RAR format into the ZIP and 7Z formats being present in the conversion policy library, the data b.RAR is converted into data b ZIP and data b.7Z in accordance with the conversion policies, and the HASH values b ZIP HASH and b.7Z.HASH for the data b.ZIP and b.7Z are calculated. At this point, since the HASH values a.ZIP.HASH, a.RAR.HASH and a.7Z.HASH are already stored in the metadata base, in response to that the HASH value a.RAR.HASH calculated for the original input data is found to be equal to a.RAR.HASH stored in the metadata base (as shown in FIG. 5B), one of a.ZIP and b.RAR is stored (or may be retained to be stored). For example, since the data a.ZIP has already been stored, the method may omit storing data b.RAR in order to save storage space. In an embodiment, it is possible that the data b.RAR may not be stored (that is, not to store b.RAR) and the pointer pointing to the data a.ZIP would be stored instead. The storage position of the pointer may be stored in the metadata base in correspondence with the file name "b.RAR" of the data b.RAR. In addition, in another embodiment, the calculated HASH values, b.RAR.HASH, b.ZIP.HASH and b.7Z.HASH, are stored in the metadata base in such a way as to correspond to the data b.RAR so as to expand the metadata base.

In another embodiment, one of the a.ZIP and the b.RAR may be selected to be stored in accordance with predetermined rules. For example, if the amount of data for b.RAR is smaller than that for a.ZIP which is already stored, it is also possible to select b.RAR to be stored and to delete data a.ZIP which is already stored. In addition, instead of the deleted data a.ZIP, it may be stored as a pointer pointing to b.RAR. Of course, the predetermined rules for selecting one of a.ZIP and b.RAR to be stored may be other rules.

Next, the data c.7Z is input. According to the method 500 shown in FIG. 5A, the HASH value, c.7Z.HASH for the input data c.7Z is calculated and, in response to conversion policies for the conversion from the 7Z format into the ZIP and RAR formats being present in the conversion policy library, the data c.7Z is converted into data c.ZIP and data c.RAR in accordance with the conversion policies and the HASH values c ZIP HASH and c.RAR.HASH for the data c.ZIP and c.RAR are calculated. At this point, since the HASH values a.ZIP.HASH, a.RAR.HASH, a.7Z.HASH, b.RAR.HASH, b.ZIP.HASH and b.7Z.HASH are already stored in the metadata base, the calculated HASH values are compared with these HASH values stored in the metadata base (one by one, or in a way that only the HASH values with the same formats are compared with each other). If the HASH value c.7Z.HASH for the original input data is found to be not the same as any of the HASH values a.7Z.HASH and b.7Z.HASH stored in the metadata base (for example, c.7Z.HASH≠a.7Z.HASH and c.7Z.HASH≠b.7Z.HASH), the data c.7Z may be stored. In addition, in an embodiment, the calculated HASH values c.7Z.HASH, c ZIP HASH and c.RAR.HASH are stored in the metadata base in such a way as to correspond to data c.7Z.

According to the process of method 500 as shown in FIGS. 5A and 5B, after the HASH values calculated for the input data and the data with the format into which the input data can be converted are compared with the stored HASH values, the two data may be determined to come from the same source data, and one of the two data from the same source data may be selectively stored, so that the data amount for storage is reduced while the amount of data to be compared is reduced. The process of the method 500 may omit storing the other selected data, and instead store the pointer pointing to the selected data to store, so that the user may retrieve the non-stored other data in the future and a good user experience is provided. The process of the method 500 may also store the HASH values calculated for the original input data and the data after conversion in the metadata base to facilitate the comparison of the HASH values in the future.

In some cases, however, for example, as for data b.RAR, since the HASH value a.RAR.HASH for the data with the same format as the input data b.RAR has already been stored in the metadata base, sometimes it may not actually need to calculate the HASH values for the data into which the input data can be converted (for example, b ZIP HASH and b.7Z.HASH). Consequently, in order to reduce the workload for calculating the HASH values and the time and cost for comparing the HASH values, the method for data management according to an embodiment may determine whether to calculate the HASH values for the data into which the input data can be converted not only in accordance with the conversion policies but also with the HASH values that are already stored. This embodiment would be described in detail below with reference to FIGS. 6A and 6B.

Figure 6A:
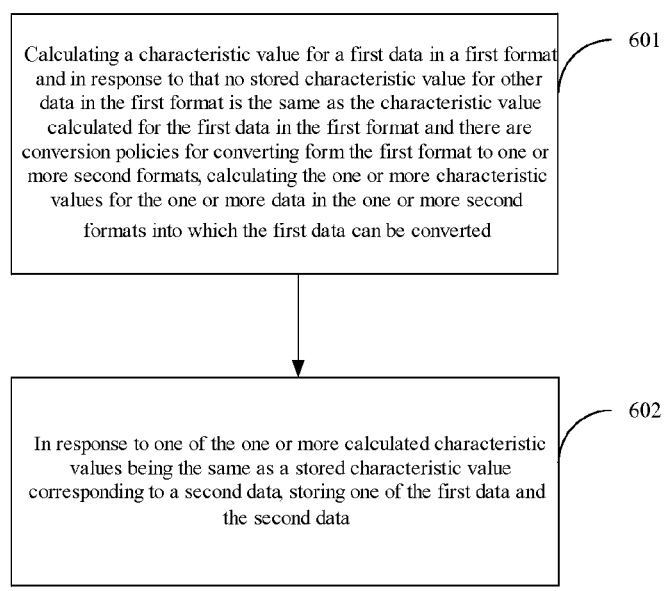
FIG. 6A shows an exemplary flow chart of a method for data management according to another embodiment of present disclosure.

FIG. 6A shows an exemplary flow chart of a method 600 for data management according to another embodiment of present disclosure and FIG. 6B shows a schematic diagram for illustrating the method as shown in FIG. 6A. The method 600 as shown in FIG. 6A includes: step S601 of calculating a characteristic value for a first data in a first format and in response to that no stored characteristic value for other data in the first format is the same as the characteristic value calculated for the first data in the first format and there are conversion policies for converting form the first format to one or more second formats, calculating the one or more characteristic values for the one or more data in the one or more second formats into which the first data can be converted; and step S602 of in response to one of the one or more calculated characteristic values being the same as a stored characteristic value corresponding to a second data, storing one of the first data and the second data.

With reference to FIG. 6B, for example, data a.ZIP is input first. It is assumed that there is no HASH value stored in the metadata base at this point. According to the method 600 shown in FIG. 6A, in the step S601, the HASH value, a.ZIP.HASH, for the input data a.ZIP is calculated and, in response to that there is no HASH value for any other data in the same format of ZIP stored in the metadata base which is the same as the HASH value a.ZIP.HASH and there are conversion policies for the conversion from the ZIP format into the RAR and 7Z formats in the conversion policy library, the data a.ZIP is converted into data a.RAR and data a.7Z in accordance with the conversion policies, and the HASH values a.RAR.HASH and a.7Z.HASH for the data a.RAR and a.7Z respectively are calculated. At this point, since there is no HASH value stored in the metadata base, it may be determined in the step S602 that there is no HASH value in the metadata base which is the same as those calculated HASH values, and the data a.ZIP may be stored directly. In addition, the calculated HASH values a.ZIP.HASH, a.RAR.HASH and a.7Z.HASH may be stored in the metadata base correspondingly to the data a.ZIP.

Next, data b.RAR is input. According to the method 600 as shown in FIG. 6A, in the step S601, the HASH value, b.RAR.HASH, for the input data b.RAR is calculated and since it is determined that a characteristic value a.RAR.HASH for other data in a RAR format has been stored, which is equal to the HASH value b.RAR.HASH calculated for the original input data (the condition that no stored characteristic value for other data in the first format is the same as the characteristic value calculated for the first data in the first format is not met), then, the method may skip conversion of the data b.RAR into data b.ZIP and data b.7Z, and may skip calculation of the HASH values b ZIP HASH and b.7Z.HASH for the data b.ZIP and b.7Z. At this point, in the step S602, since it has determined that the characteristic value a.RAR.HASH stored in the metadata base is equal to the HASH value b.RAR.HASH calculated for the original input data, one of the data a.ZIP corresponding to a.RAR.HASH and the data b.RAR may be stored. For example, since data a.ZIP has already been stored, the method may omit storing the data b.RAR so as to save the storage space. In an embodiment, the method may omit storing b.RAR but may store a pointer pointing to the data a.ZIP. Furthermore, in an embodiment, since no HASH value for the data into which the data b.RAR is converted is calculated and only the HASH value b.RAR.HASH is calculated, this calculated HASH value b.RAR.HASH is stored in such a way as to correspond to the data b.RAR. In this case, only one HASH value b.RAR.HASH is compared with all the HASH values in the metadata base, and a HASH value in the metadata base is found to be the same as the HASH value b.RAR.HASH for the input data. Therefore, the method may not perform the format conversion and the HASH value calculation, thereby reducing the workload for format conversion and HASH value comparison.

Next, data c.7Z is input. According to the method 600 as shown in FIG. 6A, in the step S601, the HASH value, c.7Z.HASH, for the input data c.7Z is calculated and, in response to that c.7Z.HASH≠a.7Z.HASH and there are conversion policies for the conversion from the 7Z format into the ZIP and RAR formats in the conversion policy library as described above (that is, the following condition is met: it is determined that no stored characteristic value for other data in the first format is the same as the characteristic value calculated for the first data in the first format and it is determined that there are conversion policies for converting from the first format to one or more second formats), then, the data c.7Z is converted into data c.RAR and data c ZIP in accordance with the conversion policies, and the HASH values c.RAR.HASH and c ZIP HASH for the data c.RAR and c.ZIP are calculated. Since c.7Z.HASH≠a.7Z.HASH, the data c.7Z itself is stored. Furthermore, in another embodiment, the calculated HASH values c.7Z.HASH, c ZIP HASH and c.RAR.HASH are stored in the metadata base in such a way as to correspond to data c.7Z.

According to the process of the method 600 as shown in FIGS. 6A and 6B, the amount of data storage can be reduced while the workload for format conversion and HASH value calculation can be reduced and the time and cost for comparing the respective HASH values can also be reduced.

In some cases, however, in the conversion policy library, there may be conversion policies for the conversion from the first format to at least one second format, but there is no conversion policy for the conversion from the at least one second format into the first format. In these cases, if, according to the method 600 shown in FIGS. 6A and 6B, it is determined that the HASH value calculated for the original input data is equal to the HASH value already stored in the metadata base, and the HASH values for the data in at least one second format into which the first data can be converted is not calculated, there may be the case where it cannot be determined whether the other data in the second format to be stored in the future is from the same source as the first data in the first format, by comparing the HASH values for the data in the second format, because the second format cannot be converted into the first format (without loss). In that case, there may be therefore the conversion policies for the conversion from the first format to at least one second format but no conversion policy for the conversion from the at least one second format into the first format, and thus it may be specified that at least one characteristic value for the at least one data in the at least one second format into which the first data can be converted would be calculated.

Figure 7B:
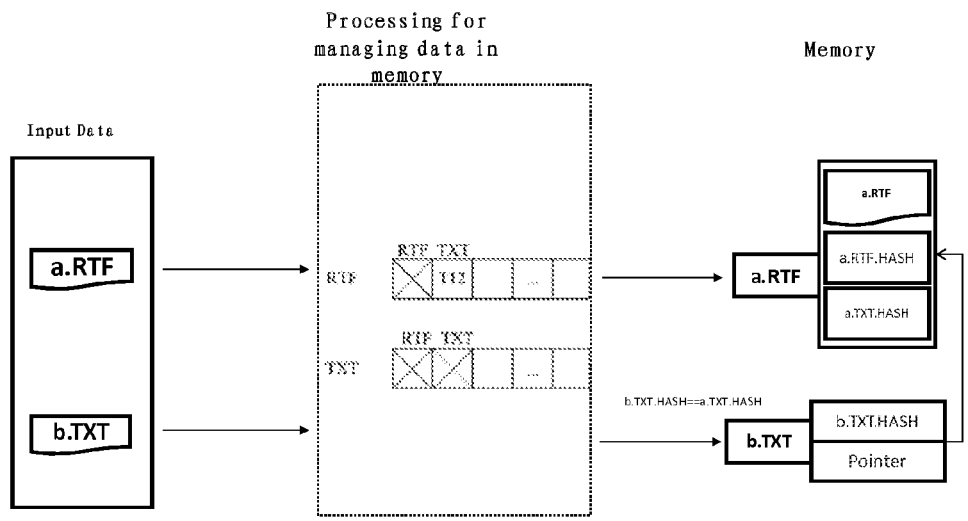
FIGS. 7B and 7C show schematic diagrams for illustrating the method as shown in FIG. 7A.
Figure 7C:
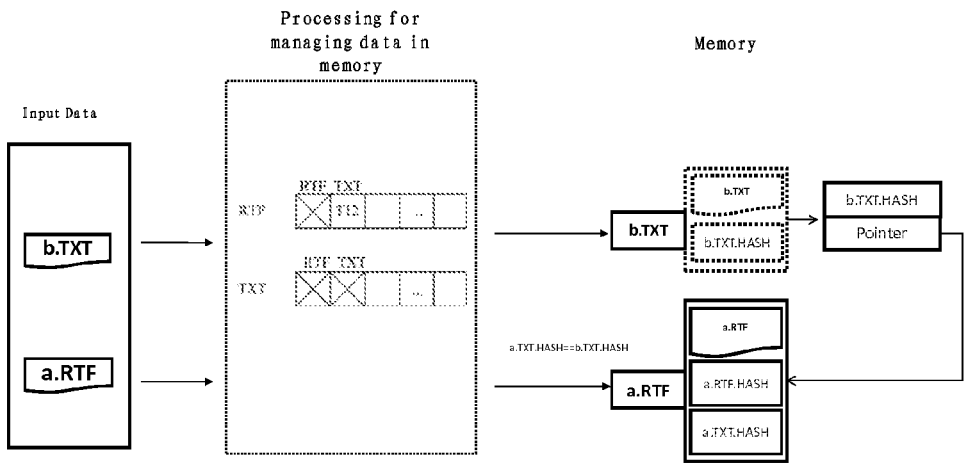

Next, an embodiment for solving this problem would be described in combination with a method 700 shown in FIGS. 7A and 7B. FIG. 7A shows an exemplary flow chart of a method 700 for data management according to another embodiment of present disclosure, and FIGS. 7B and 7C show schematic diagrams for illustrating the method as shown in FIG. 7A. As shown in FIG. 7A, the method 700 includes step S701. In step S701, a characteristic value is calculated for a first data in a first format. In step S701, in response to the presence of at least one conversion policy for converting from the first format to at least one second format, but not a conversion policy for converting from the at least one second format into the first format, at least one characteristic value is calculated for the at least one data in the at least one second format into which the first data can be converted. The method also includes step S702 of storing one of the first data and the second data, in response to one of the one or more calculated characteristic values being the same as a stored characteristic value corresponding to a second data, In the example shown in FIGS. 7B and 7C, the conversion policy library includes only a conversion policy for converting from the RTF format into the TXT format but no conversion policy for converting from the TXT format into the RTF format. That is, the conversion between the two formats is only a unidirectional conversion. "Unidirectional conversion" in this disclosure may refer to the non-bidirectional lossless conversion. For example, a video file with 1080p resolution can be converted into a file with 720p resolution without loss, but when the video file with 720p resolution is to be converted into a file with 1080p resolution, although this conversion may be performed, the file with 1080p converted from the file with 720p has a loss as compared with the original files with 1080p. Therefore it may be considered that the conversion between 1080p and 720p is a unidirectional conversion, and the conversion from RTF format into the TXT format is also of such conversion.

FIG. 7B shows a case where data a.RTF is input first and then data b.TXT is input. As shown in FIG. 7B, if the data a.RTF is input first, according to the method as shown in FIG. 7A, in the step S701, the HASH value a.RTF.HASH for the input data a.RTF is calculated. If there is a conversion policy for converting from the RTF format into the TXT format but no conversion policy for converting from the TXT format into the RTF format in the conversion policy library, a.RTF is converted into data a.TXT in the TXT format according to the conversion policy, and a HASH value a.TXT.HASH for the data a.TXT is calculated regardless of whether there is a HASH value or not in the metadata base which is the same as the HASH value a.RTF.HASH for the input data. That is to say, unlike the method as shown in FIGS. 6A and 6B, the conversion and calculation for the HASH values is not performed if there is a HASH value for the same RTF format in the metadata base which is the same as the HASH value a.RTF.HASH for the input data. Next, if there is no HASH value stored in the metadata base in advance, that is, the calculated HASH values a.RTF.HASH and a.TXT.HASH are not the same as any of those stored in the metadata base, then data a.RTF is stored. In addition, the calculated HASH values a.RTF.HASH and a.TXT.HASH may be stored in the metadata base.

In such a case, as compared with the method as shown in FIGS. 6A and 6B, the method as shown in FIG. 7A would convert the a.RTF into data a.TXT in a TXT format in accordance with the conversion policy and calculate the HASH value a.TXT.HASH for the data a.TXT regardless of whether the HASH value a.RTF.HASH for the data a.RTF is the same as the HASH value for the data in the RTF format pre-stored in the metadata base or not. According to the method as shown in FIG. 7A, it is specified that in the case where there is conversion policy for converting from the RTF format into the TXT format but no conversion policy for converting from the TXT format into the RTF format in the conversion policy library, then the data a.RTF would be converted into the data a.TXT in a TXT format and the HASH value a.TXT.HASH for the data a.TXT would be calculated. Accordingly, if data b.TXT originating from the same source data as a.RTF is input in the future, by calculating the HASH value for the data b.TXT itself, it can be determined whether data a.RTF and b.TXT come from the same source based on whether a.TXT.HASH is the same as b.TXT.HASH.

In particular, as shown in the example of FIG. 7B, data b.TXT is input next and the HASH value b,TXT.HASH for the data b.TXT is calculated. At this point, since the conversion policy library does not contain a policy for converting from the TXT format into the RTF format, b.TXT is not be converted into b.RTF, and the HASH value therefore would not be calculated. In response to b.TXT.HASH being equal to a HASH value a.TXT.HASH stored in the metadata base, the method may omit storage b.TXT but instead, may store a pointer pointing to a.RTF.

FIG. 7C shows a case where data b.TXT is input first and then data a.RTF is input. For example, as shown in FIG. 7C, if data b.TXT is input first, the HASH value b.TXT.HASH for the input data b.TXT is calculated. If the conversion policy library does not contain a policy for converting from the TXT format into the RTF format, b.TXT would not be converted into b.RTF and the HASH value therefore would not be calculated. If no HASH value is stored in the metadata base in advance, that is, the calculated HASH value b.TXT.HASH is not the same as those stored in the metadata base, then data b.TXT is stored. In addition, the calculated HASH value b.TXT.HASH may be stored in the metadata base.

Next, data a.RTF is input and the HASH value a.RTF. HASH for the input data a.RTF is calculated, and in response to that there is a conversion policy for converting from the RTF format into the TXT format but no conversion policy for converting from the TXT format into the RTF format in the conversion policy library, a. RTF would be converted into data a. TXT in a TXT format in accordance with the conversion policy and the HASH value a.TXT.HASH for the data a.TXT would be calculated.

In this case, the step S702 in the method as shown in FIG. 7A may further include: in response to that one of the HASH values calculated for the data in the at least one second format is the same as the HASH value corresponding to the second data which has already been stored, storing the first data, deleting the second data and storing an indicator pointing to the first data instead of the second data which is deleted. For example, as shown in FIG. 7C, in response to that the HASH value a.TXT.HASH calculated for the converted data a.TXT in a TXT format is equal to b.TXT.HASH stored in the metadata base, it can be determined that the data a.RTF comes from the same source as the data b.TXT to which the b.TXT.HASH stored in the metadata base corresponds. Therefore, at this point, as described earlier, since b.TXT has been stored in the memory, in order to avoid data redundancy, in one embodiment, the data b.TXT stored previously may be deleted from the memory and a pointer pointing to the data a.RTF (as shown in FIG. 7C) may be stored instead of the data b.TXT which is deleted. In addition, the calculated HASH values a.RTF.HASH and a.TXT.HASH may be stored in the metadata base (as shown in FIG. 7C).

As such, even in the case where b.TXT which cannot be converted is first input and stored and then a.RTF originating from the same source data which can be converted is input later, the b.TXT originating from the same source data as a.RTF can also be found and the data de-duplication can be realized by deleting the previously stored b.TXT and replacing the deleted b.TXT with the pointer pointing to a. RTF and storing the a.RTF itself. Furthermore, when the unstored b.TXT is to be retrieved in the future, a.RTF can be found by using the pointer pointing to a.RTF and converting it into a.TXT, as b.TXT, with the conversion policy from RTF format into TXT format (which would be described in detail later with reference to FIG. 8).

According to the method 700 as shown in FIGS. 7A and 7B, even when data is subject to only unidirectional conversion, a good user experience can be maintained while the amount of data storage is reduced.

Some embodiments of the methods for data management in storing new data or clearing up already-stored data illustrated above with reference to FIGS. 2-7.

Figure 8:
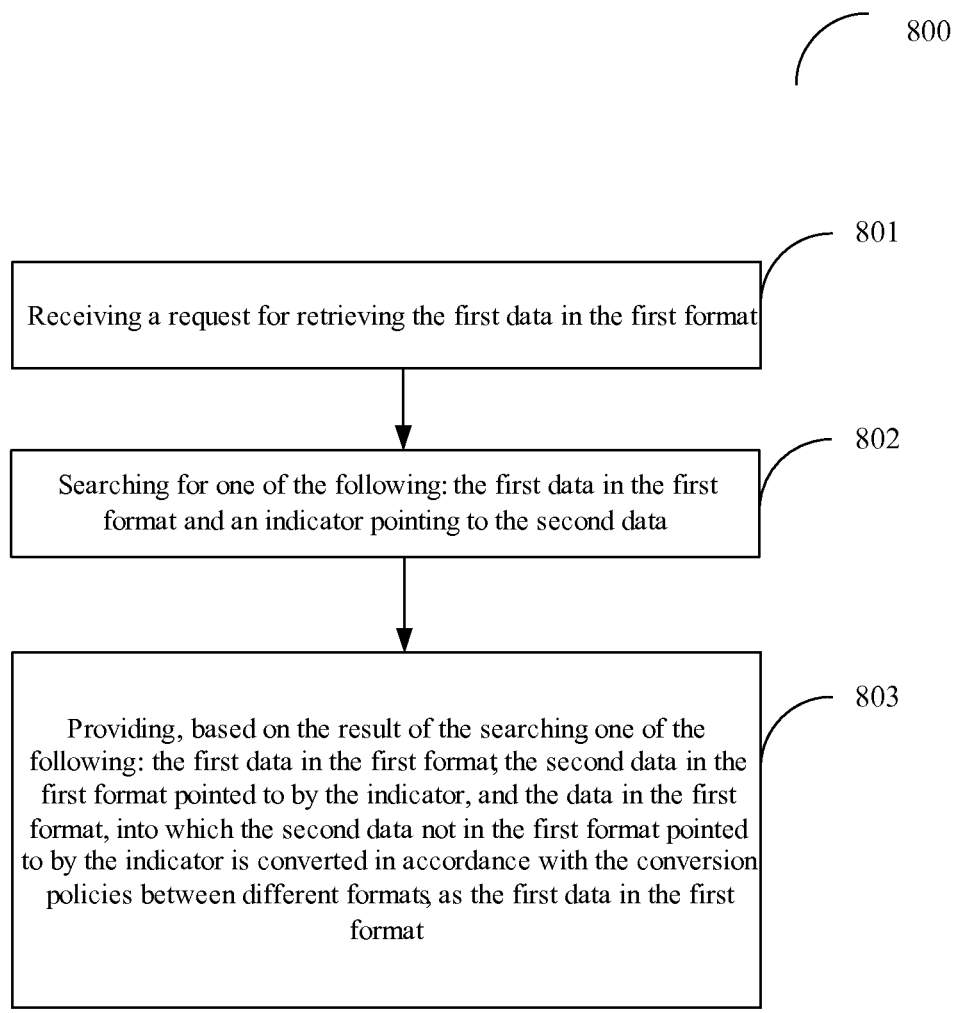
FIG. 8 shows an exemplary flow chart of a process in retrieving data in a method for data management according to another embodiment of the present invention.

FIG. 8 shows an exemplary flow chart of a process 800 in retrieving data in a method for data management according to another embodiment of the present invention. The process 800 includes: step S801 of receiving a request for retrieving the first data in the first format; step S802 of searching for one of the following: the first data in the first format and an indicator pointing to the second data; and step S803 of providing, based on the result of the searching, one of the following: the first data in the first format, the second data in the first format pointed to by the indicator, and the data in the first format, into which the second data not in the first format pointed to by the indicator is converted in accordance with the conversion policies between different formats, as the first data in the first format.

As described in the embodiments illustrated in FIGS. 2-7, with the methods for data management, the following results may be obtained: the data itself is stored directly; the pointer pointing to other data is stored; or other results.

In the case where the data itself is stored directly, in the step S802, the first data is found and if this first data is to be retrieved, the first data which has been found is provided directly in the step S803.

In the case where the pointer pointing to other data is stored, in the step S802, the pointer is found and if the other data to which the pointer points is of the first format, the other data to which the pointer points may be provided directly in the step S803 as the first data without any conversion.

Alternatively, in the case where the other data to which the pointer points is of a different format from that of the data to be stored or cleared up, for example, in the step S802, the pointer pointing to the other data is found and if the other data to which the stored pointer points is not of the first format, the other data to which the stored pointer points can be converted into the first format in accordance with the conversion policies, and the data converted into the first format may be provided as the first data to be retrieved in the step S803. It is to be noted that in this embodiment, the conversion policy library which is referred to in retrieving data may be the same as the conversion policy library referred to in storing (or clearing up) the data, or may be set in advance and/or be expansible. Nevertheless, it is not a limitation, and in some cases the two conversion policy libraries used in retrieving and storing data may be different.

It is to be noted that "pointing to" data in this disclosure may point to a data directly or to another pointer directly and the other pointer may in turn point to a data, that is, "pointing to" data may include pointing to a data indirectly. Therefore, "pointing to" data in this disclosure may include pointing to data directly or indirectly.

As such, according to the method in FIG. 8, the user may successfully retrieve the desired data while reducing the amount of data, thereby obtaining a good user experience.

Consequently, with the methods as shown in FIGS. 2-8 according to the embodiments disclosed herein, after the HASH values calculated for the input data and the data with the format into which it can be converted are compared with the HASH values which have already been stored, two data from the same source data can be determined, and one of the two data from the same source data may be selectively stored. In this manner, the data amount for storage is reduced while the amount of data to be compared is also reduced. The methods according to the embodiments of the present disclosure may also omit storing the other data which is selected to not store and instead store a pointer pointing to the data selected to store, so that the user may retrieve the other data which is not stored in the future, and a good user experience is maintained. The methods according to the embodiments of the present disclosure may also store the HASH values calculated for the original input data and the data after conversion to facilitate the comparison of the HASH values in the future. The methods according to some of the embodiments of the present disclosure can also reduce the amount of data storage while the workload for the format conversion and for calculating the HASH values are reduced, and/or reduce the time and cost for comparing the HASH values are reduced.

Figure 9:
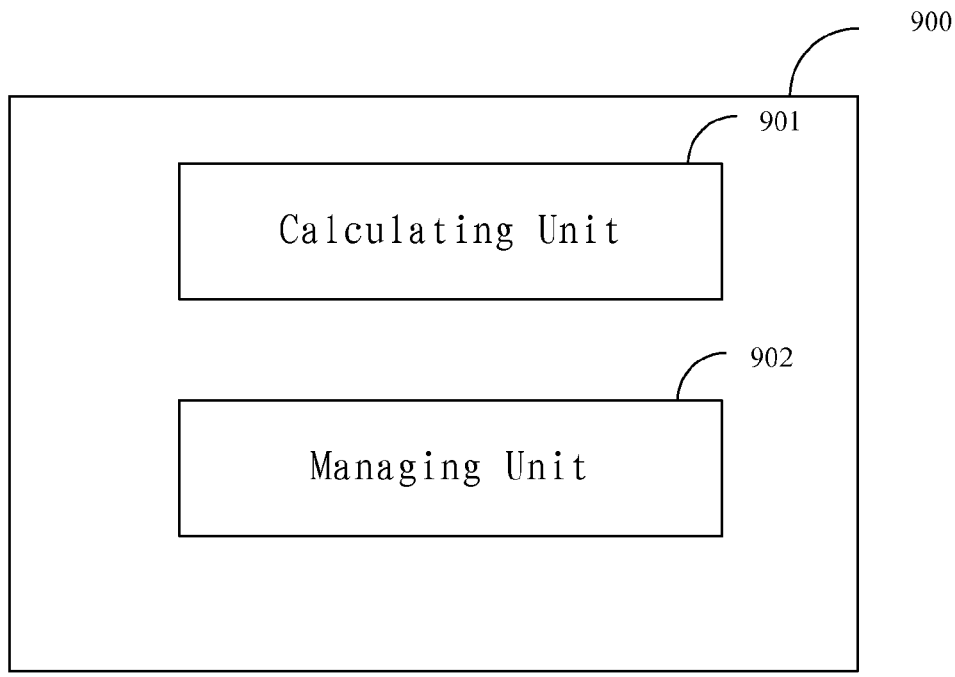
FIG. 9 shows an exemplary block diagram for a system for data management according to another embodiment of the present invention.

FIG. 9 shows an exemplary block diagram for a system 900 for data management according to another embodiment disclosed herein. The system 900 for data management as shown in FIG. 9 includes a calculating unit 901 configured to calculate one or more of the following: a characteristic value for a first data in a first format, one or more characteristic values for one or more data in one or more second formats into which the first data can be converted, said characteristic value uniquely representing an arrangement characteristic of at least part of bits of data in a particular format; and a managing unit 902 configured to, in response to one of the one or more calculated characteristic values being the same as a stored characteristic value corresponding to a second data, store one of the first data and the second data. According to an embodiment, the characteristic values may be HASH values.

Figure 10:
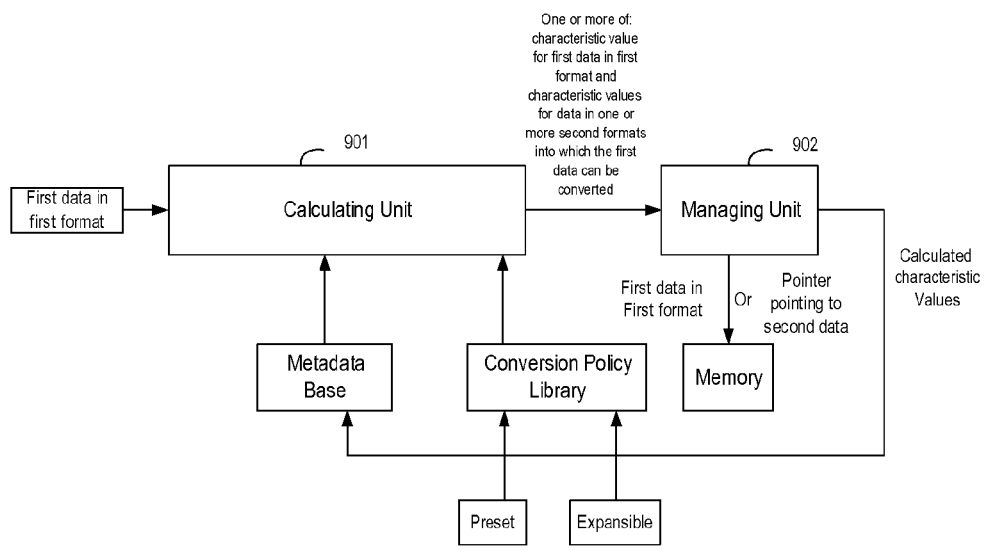
FIG. 10 shows a schematic diagram for illustrating the process of the system for data management according to another embodiment of the present invention.

FIG. 10 shows a schematic diagram for illustrating the process of the system 900 for data management in FIG. 9.

With reference to FIG. 10, according to an embodiment, the managing unit 902 shown in FIG. 9 may be further configured to, in response to that one of the first data and the second data is stored (for example, the second data is maintained to be stored in the example shown in FIG. 10), omit storing the other one of the first data and the second data (not to store the first data in the example shown in FIG. 10) and instead store an indicator pointing to said one of the first data and the second data (to store an indicator pointing to the second data in the example shown in FIG. 10). With reference to FIG. 10, according to an embodiment, the managing unit 902 as shown in FIG. 9 may be further configured to store the first data in response to none of the calculated characteristic values being the same as those already stored. Therefore, as shown in FIG. 10, the managing unit 902 may store the first data, or may omit storing the first data but store the indicator pointing to the second data.

With reference to FIG. 10, according to an embodiment, the managing unit 902 shown in FIG. 9 may be further configured to store the calculated characteristic values, in such a way as to correspond to the first data. Therefore, as shown in FIG. 10, the managing unit 902 may also store the characteristic value calculated for the first data in the first format and the one or more characteristic values for one or more data in one or more second formats into which the first data can be converted, in a metadata base for storing characteristic values.

With reference to FIG. 10, according to an embodiment, the calculating unit 901 as shown in FIG. 9 may also include a first calculating unit (not shown in the figures) configured to calculate the characteristic value for the first data in the first format and a second calculating unit (not shown in the figures) configured to determine whether to calculate the one or more characteristic values for the one or more data in the one or more second formats into which the first data can be converted at least based on conversion policies between different formats. With reference to FIG. 10, according to an embodiment of the present invention, the conversion policies between these different formats may be stored in the conversion policy library, and the conversion policies stored in the conversion policy library may be preset and/or be expansible.

With reference to FIG. 10, according to an embodiment, the second calculating unit (not shown in the figures) may be configured to, in response to one or more conversion policies for converting from the first format into the one or more second formats existing, calculate one or more characteristic values for the one or more data in the one or more second formats into which the first data can be converted, according to the one or more conversion policies.

With reference to FIG. 10, according to an embodiment, the second calculating unit (not shown in the figures) may be configured to, in response to that no stored characteristic value for other data in the first format is the same as the characteristic value calculated for the first data in the first format and there are conversion policies for converting from the first format into the one or more second formats, calculate the one or more characteristic values for the one or more data in the one or more second formats into which the first data can be converted.

With reference to FIG. 10, according to an embodiment, the second calculating unit may be configured to, in response to that there is at least one conversion policy for converting from the first format to at least one second format but no conversion policy for converting from the at least one second format into the first format, calculate at least one characteristic value for the at least one data in the at least one second format into which the first data can be converted according to the at least one conversion policy. In this case, according to an embodiment, the managing unit 901 as shown in FIG. 9 may be further configured to, in response to that one of the calculated characteristic values is the same as a characteristic value corresponding to the second data which has been stored, store the first data, delete the second data and store an indicator pointing to the first data.

With reference to FIG. 10, the system 900 as shown in FIG. 9 may further include a receiving unit (not shown in the figures) configured to receive a request for retrieving the first data in the first format; a searching unit (not shown in the figures) configured to search for one of the following: the first data in the first format and an indicator pointing to the second data; and a providing unit (not shown in the figures)

configured to provide, based on the result of the searching, one of the following: the first data in the first format, the second data in the first format pointed to by the indicator, and the data in the first format, into which the second data not in the first format pointed to by the indicator is converted in accordance with the conversion policies between different formats, as the first data in the first format.

By the way, the system 900 for data management as shown in FIG. 9 may further include means, modules, or sections for carrying out the steps and functions of the methods for data management as described with reference to FIGS. 2-8, the details thereof being omitted here.

With the system 900 according to the embodiments of the present disclosure as shown in FIGS. 9 and 10, after the HASH values calculated for the input data and the data with the format into which it can be converted are compared with the HASH values which have already been stored, two data from the same source data can be determined, and one of the two data from the same source data may be selectively stored, so that the data amount for storage can be reduced while the amount of data to be compared can be reduced. The system 900 may omit storing other data which is selected to not store but instead store a pointer pointing to the data selected to store, so that the user may retrieve the other data which is not stored in the future and a good user experience is provided. The system 900 may also store the HASH values calculated for the original input data and the data after conversion in the metadata base to facilitate the comparison of the HASH values in the future. Some of the embodiments for the system 900 can also reduce the amount of data storage while the workload for the format conversion and for calculating the HASH values are reduced and/or the time and cost for comparing the HASH values are reduced. It is to be noted that the advantages and effects mentioned in the present disclosure are only for illustration but not limitations on the present disclosure.

The flowchart and block diagrams in the Figures illustrate the architecture, functionality, and operation of possible implementations of systems, methods, and computer program products according to various embodiments disclosed herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It would also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations would be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for data management, comprising:
calculating a first hash value for a first data in a first format;
in response to locating a stored hash value that corresponds to the first hash value, not storing the first data; and
in response to not locating a stored hash value that corresponds to the first hash value:
converting the first data into one or more data in alternate formats in accordance with one or more conversion policies for converting between the first format and the one or more alternate formats, wherein the one or more conversion policies are stored in a conversion policy library;
calculating a hash value for each of the one or more data in alternate formats;
storing one copy of the first data; and
storing the calculated hash values, including the first hash value, separately from the first data, each of the calculated hash values having fewer bits than the first data in any of the alternate formats,
thereby providing alternate stored hash values for the first data, the alternate stored hash values used for identifying duplicate copies of the first data when the first data is in any of the alternate formats, wherein a number of computer calculations required to identify duplicate copies of the first data using the alternate hash values is less than a number of computer calculations required to identity duplicate copies of the first data using any of the alternate formats.

2. The method according to claim 1, further comprising:
in response to not storing the first data, storing an indicator pointing to the first data.

3. The method according to claim 2, further comprising:
receiving a request to retrieve the first data in the first format; and
providing one of the following as the first data in the first format: the first data as stored in the first format, the first data as pointed to by the indicator; and a second data as converted into the first format in accordance with the conversion policies.

4. A system for data management, comprising a calculating unit and a managing unit, the system configured to:
calculate a first hash value for a first data in a first format;
in response to locating a stored hash value that corresponds to the first hash value, not storing the first data; and
in response to not locating a stored hash value that corresponds to the first hash value:
convert the first data into one or more data in alternate formats in accordance with one or more conversion policies for converting between the first format and the one or more alternate formats, wherein the one or more conversion policies are stored in a conversion policy library;
calculate a hash value for each of the one or more data in alternate formats;
store one copy of the first data; and
store the calculated hash values, including the first hash value, separately from the first data, each of the calculated hash values having fewer bits than the first data in any of the alternate formats, thereby providing alternate stored hash values for the first data, the alternate stored hash values used for identifying duplicate copies of the first data when the first data is in any of the alternate formats, wherein a number of computer calculations required to identify duplicate copies of the first data using the alternate hash values is less than a number of computer calculations required to identity duplicate copies of the first data using any of the alternate formats.

5. The system according to claim 4, wherein the system is further configured to:

store an indicator pointing to the first data in response to not storing the first data.

6. The system according to claim 4, wherein the system is further configured to:

receive a request to retrieve the first data in the first format; and provide one of the following as the first data in the first format: the first data as stored in the first format, the first data as pointed to by the indicator; and a second data as converted into the first format in accordance with the conversion policies.

7. A computer program product for data management, the computer program product comprising a non-transitory computer readable storage medium having program code embodied therewith, the program code executable by a processor to perform a method, the method comprising:

calculating a first hash value for a first data in a first format;

in response to locating a stored hash value that corresponds to the first hash value, not storing the first data; and in response to not locating a stored hash value that corresponds to the first hash value:

converting the first data into one or more data in alternate formats in accordance with one or more conversion policies for converting between the first format and the one or more alternate formats, wherein the one or more conversion policies are stored in a conversion policy library;

calculating a hash value for each of the one or more data in alternate formats;

storing one copy of the first data; and storing the calculated hash values, including the first hash value, separately from the first data, each of the calculated hash values having fewer bits than the first data in any of the alternate formats, thereby providing alternate stored hash values for the first data, the alternate stored hash values used for identifying duplicate copies of the first data when the first data is in any of the alternate formats, wherein a number of computer calculations required to identify duplicate copies of the first data using the alternate hash values is less than a number of computer calculations required to identity duplicate copies of the first data using any of the alternate formats.

8. The computer program product according to claim 7, the method further comprising:

in response to not storing the first data, storing an indicator pointing to the first data.

9. The computer program product according to claim 8, the method further comprising:

receiving a request to retrieve the first data in the first format; and providing one of the following as the first data in the first format:

the first data as stored in the first format, the first data as pointed to by the indicator; and a second data as converted into the first format in accordance with the conversion policies.

* * * * *